US012718145B2

(12) United States Patent
Lake et al.

(10) Patent No.: US 12,718,145 B2
(45) Date of Patent: Aug. 25, 2026

(54) METHOD FOR CORRECTING BIAS INTRODUCED BY WEIGHTED TRAINING IN MACHINE LEARNING

(71) Applicant: National Astronomical Observatories, Chinese Academy of Sciences, Beijing (CN)

(72) Inventors: Sean Lake, Beijing (CN); Chao-Wei Tsai, Beijing (CN)

(73) Assignee: National Astronomical Observatories, Chinese Academy of Sciences, Beijing (CN)

( * ) Notice: Subject to any disclaimer, the term of this patent is extended or adjusted under 35 U.S.C. 154(b) by 969 days.

(21) Appl. No.: 17/822,799

(22) Filed: Aug. 29, 2022

(65) Prior Publication Data

US 2023/0072631 A1 Mar. 9, 2023

(51) Int. Cl.
*G06N 20/00* (2019.01)
*G06N 7/01* (2023.01)

(52) U.S. Cl.
CPC ............... *G06N 20/00* (2019.01); *G06N 7/01* (2023.01)

(58) Field of Classification Search
CPC ................................ G06N 20/00; G06N 7/01
See application file for complete search history.

(56) References Cited

U.S. PATENT DOCUMENTS 11,301,504 B2 * 4/2022 Connell, II ........... G06F 16/355
11,562,178 B2 * 1/2023 Cai ....................... G06F 18/217
11,720,818 B2 * 8/2023 Ribera Prat ............ G06N 3/084 706/12

OTHER PUBLICATIONS

Quinn et al., "Classification for accuracy and insight: A weighted sum approach." AusDM 70 (Year: 2007).*
Wallace et al., "Class probability estimates are unreliable for imbalanced data (and how to fix them)." 2012 IEEE 12th international conference on data mining. IEEE (Year: 2012).*

* cited by examiner

*Primary Examiner* — Adam C Standke
(74) *Attorney, Agent, or Firm* — OPENPTO US LLC; Yuhao Liang

(57) ABSTRACT

Provided is a method for correcting bias introduced by weighted training in machine learning, comprising: labeling the number of examples of each class in weighted data used by a machine learning classifier; adding a weight to training data, and calculating a weight $w_{ij}$ of each data example j in class i of the training data according to a user-given data weighting method; calculating a mean weight $w_i$ for examples of each class; conducting classification and logistic regression against features of the examples in the weighted data and labels corresponding to the features; after training, when calculating probabilities $P_w(i)$ of class after machine training using the machine learning classifier, correcting the probabilities P(i) by applying a deweighting formula to obtain corrected probabilities P(i); making a classification decision based on the corrected probabilities P(i). The method improves the accuracy of classifiers in assigning probabilities to new data in machine learning applications.

9 Claims, 4 Drawing Sheets

METHOD FOR CORRECTING BIAS INTRODUCED BY WEIGHTED TRAINING IN MACHINE LEARNING

CROSS-REFERENCE TO RELATED APPLICATIONS

This application claims the benefit and priority of Chinese Patent Application Number 202111048118.8, filed on Sep. 8, 2021 with China National Intellectual Property Administration, the disclosures of which are incorporated herein by reference in their entireties.

FIELD OF THE INVENTION

The present invention relates to an artificial intelligence technology, specifically related to machine learning technology, and in particular to a method for correcting bias introduced by weighted training of Bayes classifiers in machine learning.

BACKGROUND OF THE INVENTION

A common goal of machine learning is to produce a machine that can quickly classify new input samples into categories. For example, one might want a program to classify images containing either a cat or a dog into a corresponding category. Such programs are called "classifiers." To construct a classifier, one of the most used techniques is to feed examples with known classifications into a machine learning algorithm in a "training" process. After training, the classifier produces two results. First, it estimates of the probability that the example belongs to each class (or proxies for the probabilities). Using the estimated probabilities, it then assigns a class label to each example. The most common practice is to label each example with the name of the class it has the highest probability of being. This type of classifier is called a "Bayes classifier." If the probability estimates are accurate, Bayes classifiers minimize the number of mistaken classifications. It is worth noting that probabilities are often neither calculated explicitly nor reported. Internal to the program, however, there are always quantities that play the same role. Whether they are true probabilities or not, such quantities are (almost) always sensitive to the balance of examples in the training sample set in a similar way.

When one class of object is relatively rare in the training sample, standard practice is to balance the data used to train the classifier to simulate a data set with an equal mix of each example. For example, by repeating the examples of the rare class(es), or by discarding part of common examples. The common goal of this practice is often, explicitly, to adjust the classification decisions on the rare class(es) made by the machine learning trained classifier.

To better clarify the reasons why a classifier might "ignore" rare data, here we consider a simple illustrative example: as shown in FIG. 1, given an image, decide whether it contains a dog, wolf, or North American coyote. The problem of classifying images of these three types of canids has the two features that make considerations of weighting important: (1) images of dogs are usually much more common (numerous) in the training sample than images of the other two types of animals, and (2) there is intrinsic feature overlap among the three classes. If the classifier were to extract an estimate of the size (mass) of the animal from the image, then histograms of size split by class might produce a graph as shown in the upper-right image in FIG. 1.

In situations like this where the number of features is low (in this case only the mass of the animal is characterized), the probabilities that an accurately trained classifier would produce can be estimated from histograms of the training data. The calculation is done in two steps: first find the bin that the new example belongs in, then take the number of training examples of each type and divide by the total in that bin. Applying such an estimate to the upper-right panel of FIG. 1 reveals that the most commonly used classifier, Bayes, will never assign a new example to the coyote class because it is outnumbered by dogs in every bin. The way weighting fixes this is to tell the machine learning algorithm that examples from the rare class count for more than one source. If the training data were weighted to simulate an equal number of images from each class, then the "Weighted data" histogram as shown in lower-right panel of FIG. 1 is the effective result. Because the histograms are directly related to the probabilities, though, this show that the "up-weighting" approach produces inaccurate, biased, probabilities for any data that share bins with the rare training data.

In FIG. 1, histograms illustrating the effects of weighting on training data, based on an imaginary task of distinguishing dogs, wolves, and coyotes. The histogram at the upper right of FIG. 1 represents the unweighted original data, and the histogram at the lower right is the result of the equal number of examples of each class when the data is manipulated and weighted. The vertical shaded bands show where a Bayes classifier would assign new examples to the labeled class. Note how no new examples will be assigned to the coyote class by the Bayes classifier without weighting.

FIG. 2 provides a visual summary of the standard practice for producing and applying a machine learning classifier using weighting. In this figure the relative size of each data cloud represents its relative prevalence in the training and real data. The process starts in the upper left corner of FIG. 2, the labeled training data is input to the weighter to train according to the given machine learning algorithm. The job of the weighter is to assign a weight to each example. Generally, in order to avoid the problem that rare classes appear in the training data with a low probability due to the small number of examples, and therefore ignored by the classifier, the user of the machine learning algorithm will increase the weight of the rare classes. All classes are given weights to simulate training data with equal abundance in each class here. This is shown on the graph by the relative sizes of the classes becoming equal. The next step in the machine learning algorithm is to provide it to the probability calculator in the classifier (grey dashed box), and then calculate the probability that the input example belongs to each class. The final step is for the labeler to use some criterion to assign a label to each datum. When that criterion is to assign the label with the highest probability the classifier is called a Bayes classifier.

The practice of class-weighted balancing for the training data of machine learning will cause the classifier to produce a deviation between the classification judgment probability and the real class probability in the input training data. Because probabilities are used to assign class labels, probabilistic bias directly affects the statistical accuracy of class labels assigned by a classifier, regardless of the labelling criterion.

SUMMARY OF THE INVENTION

Aiming at the technical problem of statistical bias in calculated after excessive weighting of groups of rare samples in existing machine classification training, the purpose of the present invention is to provide a method for correcting said bias.

The method to correct the bias comprises the following steps:

S1. label the number of examples of each class in the weighted data used by the machine learning classifier: sum up the total number of training examples from class i in the training set and label these quantities $N_i$;

S2. input the training data into the weighter, and calculate the weight $w_{ij}$ of each data example j in a class i of the training data according to user-given data weighting method;

S3. calculate the mean weight $w_i$ for examples of each class;

S4. train the classifier by a machine learning algorithm to the training data and weights, as usual;

S5. after training, when the classifier calculates probabilities $P_w(i)$ of the class i, correct them by applying the deweighting formula of the deweighter to get accurate probabilities P(i);

S6. use the corrected probabilities P(i) to make a classification decision.

Preferably, the classifier is a Bayes classifier.

Preferably, in step S2, the "user-given data weighting method" refers to the weight selected by the user according to the data example size of each key class or personal preference.

Preferably, the classifier includes two subunits, a probability calculator and a labeler; the probability calculator used to calculate the probability that each single input example belongs to a certain class; the labeler, according to the probability that the input example belongs to each class calculated by using the probability calculator, decides to assign the example to a single class.

Preferably, the "weighting" in step S2 is assigning a weight to each training data example as the basis for calculating the training probability of the Bayes classifier.

Preferably, in step S3, the method for calculating the mean weight for class i by classifier is: in class i of the weighted data, by summing each of the weight $w_{ij}$ given to the example j by class and then dividing by the total number $N_i$ of class i, and label this mean weight of class i $w_i$. The mean weight $w_i$ can be calculated according to the following formula:

$$w_i = \frac{1}{N_i}\sum_j w_{ij} \quad (1)$$

Preferably, the deweighter is used to correct the probability $P_w(i)$ calculated by the probability calculator by applying the deweighting formula to get accurate probabilities P(i).

Preferably, the deweighting formula is defined as follows:

$$P(i) = \frac{w_i^{-1} P_w(i)}{\sum_n w_n^{-1} P_w(n)} \quad (2)$$

Wherein, each class of object is given the label i, the mean weight used on each class to simulate balanced data is labeled $w_i$, and the probability the classifier assigns to some new example data being from class i is $P_w(i)$; n is a dummy index in the summation operation, $w_n$ is a mean weight of the n-th class, and $P_w(n)$ is a probability for the n-th class assigned by the classifier. Then the bias can be removed by computing revised probabilities according to the deweighting formula. Preferably, in the process of calculating the mean weight of each class, the weight of each sample is 1 by default unless it is specifically set to some other value. Preferably, the bias can be corrected by dividing each probability by the category's corresponding weight, and then renormalize the probabilities across all categories. Preferably, in the process of deweighting, the number of common examples is first controlled within the comparable range. When the number of common examples exceeds the threshold, the common examples should be randomly discarded to bring them within that range. so that the number of common examples is controlled to be less than or equal to 10 times the number of rare examples.

According to the method and program for applying reconstructed natural weighting in machine learning according to the present invention, after weighted training, it can correct the bias caused by over-weighting of rare examples in machine learning, and improve the accuracy of the Bayes classifier's probability of identifying rare group classes in new data in certain scenarios.

DETAILED DESCRIPTION OF THE INVENTION

In the following, the details and working conditions of a specific device provided by the present invention are described in combination with the figures. It should be understood that the specific embodiments described herein are only used to illustrate and explain the present invention, but not to limit the present invention.

Currently, it is common in machine learning classifier training, in order to increase the probability and efficiency of Bayes classifiers learning to select rare groups, for machine learning programs or users to over-weight the groups with rare examples in the training data. The method of over-weighting the data of the rare groups can be described as: adjusting the number of examples away from what is inherent in each group in the training data in order to better balance the number of training examples in groups of interest with other different groups. The classification probability of the classifier trained by the machine learning program is defined by the proportion of each group in the training data near to the datum to be classified. Therefore, changing the training weight by changing the example number of each group in the training data will lead to the statistical bias in the final classification.

Another reason for up-weighted rare classes, or down-weighting common ones, arises when the classifier is working with data that has multiple common classes. When there are multiple common classes the machine learning algorithm could prioritize focusing the classifier's resources on finely characterizing the boundary between the common classes. Weighting the data can ensure that more of the classifier's resources are devoted to the question of whether new examples are in the rare class. At the end of the training, the probability calculator of the classifier calculates the probability that each input example belongs to each group class, the deweighter then makes the reverse correction according to the weight change amount, and then the labeler assigns the class label that the example should belong to using the modified probability.

The application of such a technique is not limited to correcting for bias from weighting, but can also remove another statistical bias in the classification probability. Specifically: it is common for training data to be imbalanced compared to the data on which a machine learning classifier is actually applied. Because weighting simulates exactly this scenario, any procedure that corrects for weighting bias will be similarly effective.

The process of adjusting the data imbalance bias is: divide the class probability of the training data imbalance by the corresponding weight of the class, and then re-normalizing the probability of all groups. The name of this process is "deweighting." Deweighting cannot detect or measure the bias, but once the bias is known deweighting makes it possible to address it without having to retrain the classifier.

Figure 1:
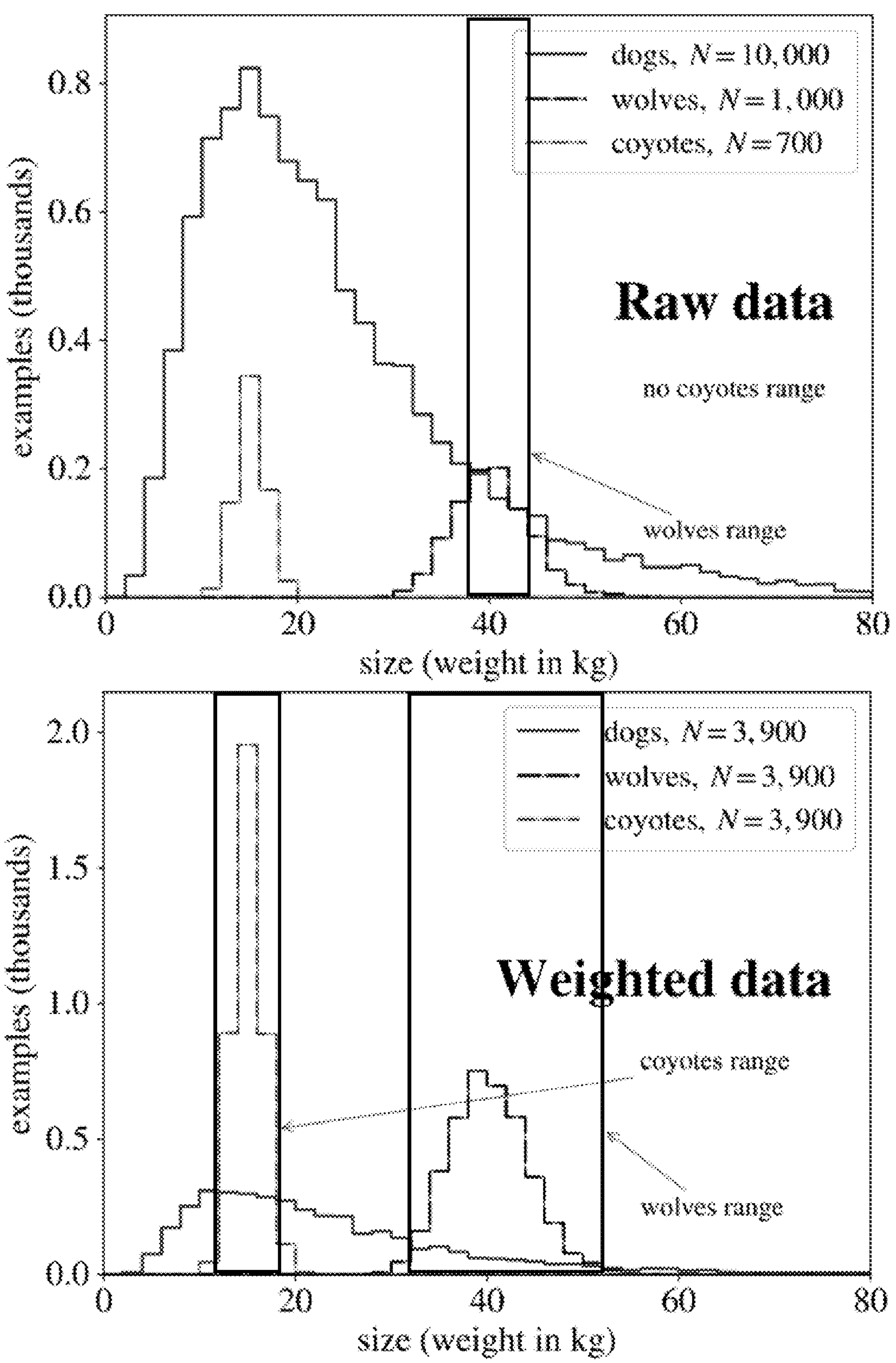
FIG. 1 is a schematic diagram of the weighting bias caused by the excessive weighting of the classifier to the groups of rare samples by using machine learning in the prior art, by taking three kinds of canines as examples.
Figure 2:
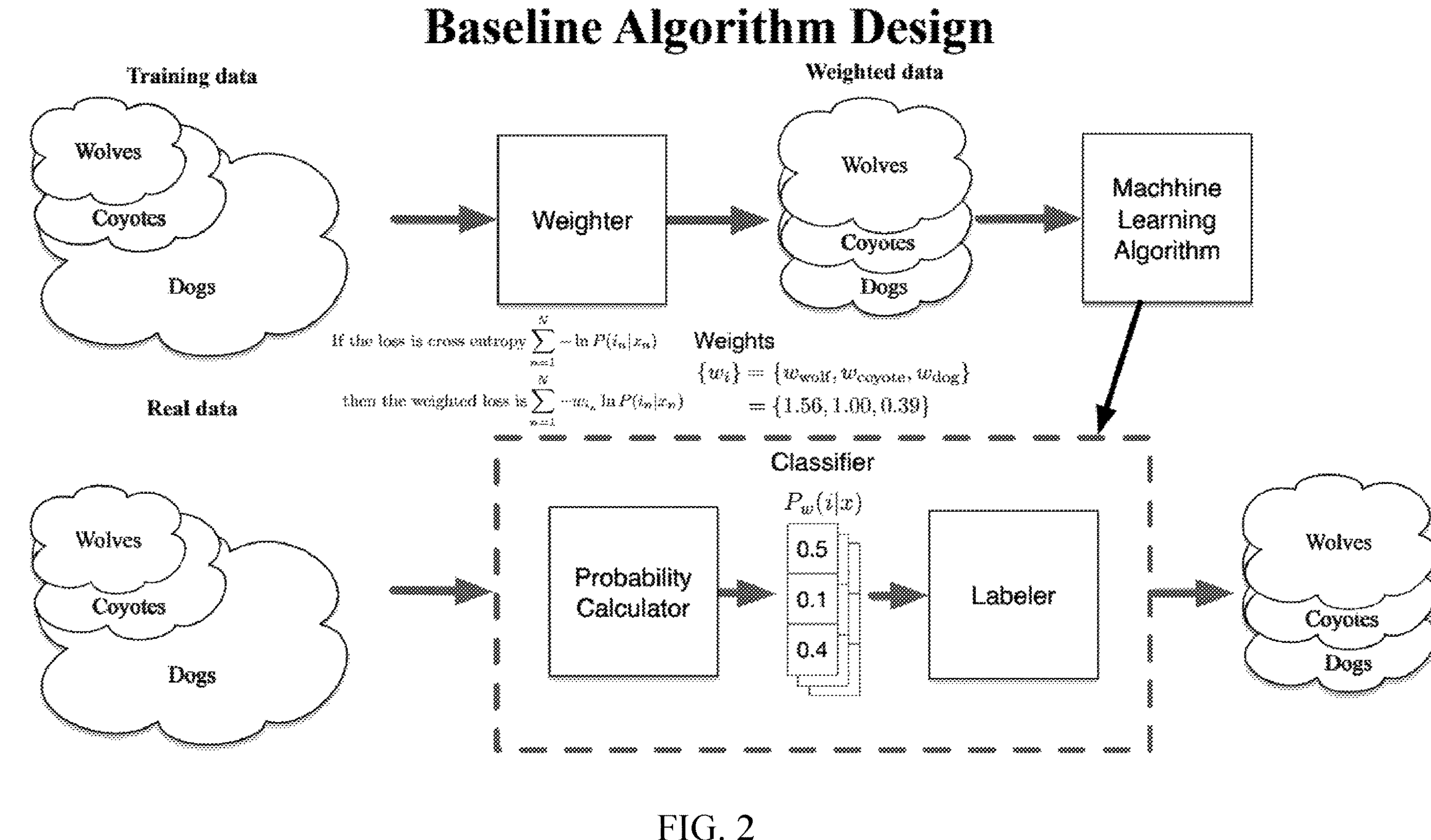
FIG. 2 is a flowchart of the principle flow of the existing machine learning technology for overweighting the classes of rare examples, in order to increase the likelihood that Bayes classifiers will identify rare classes.
Figure 3:
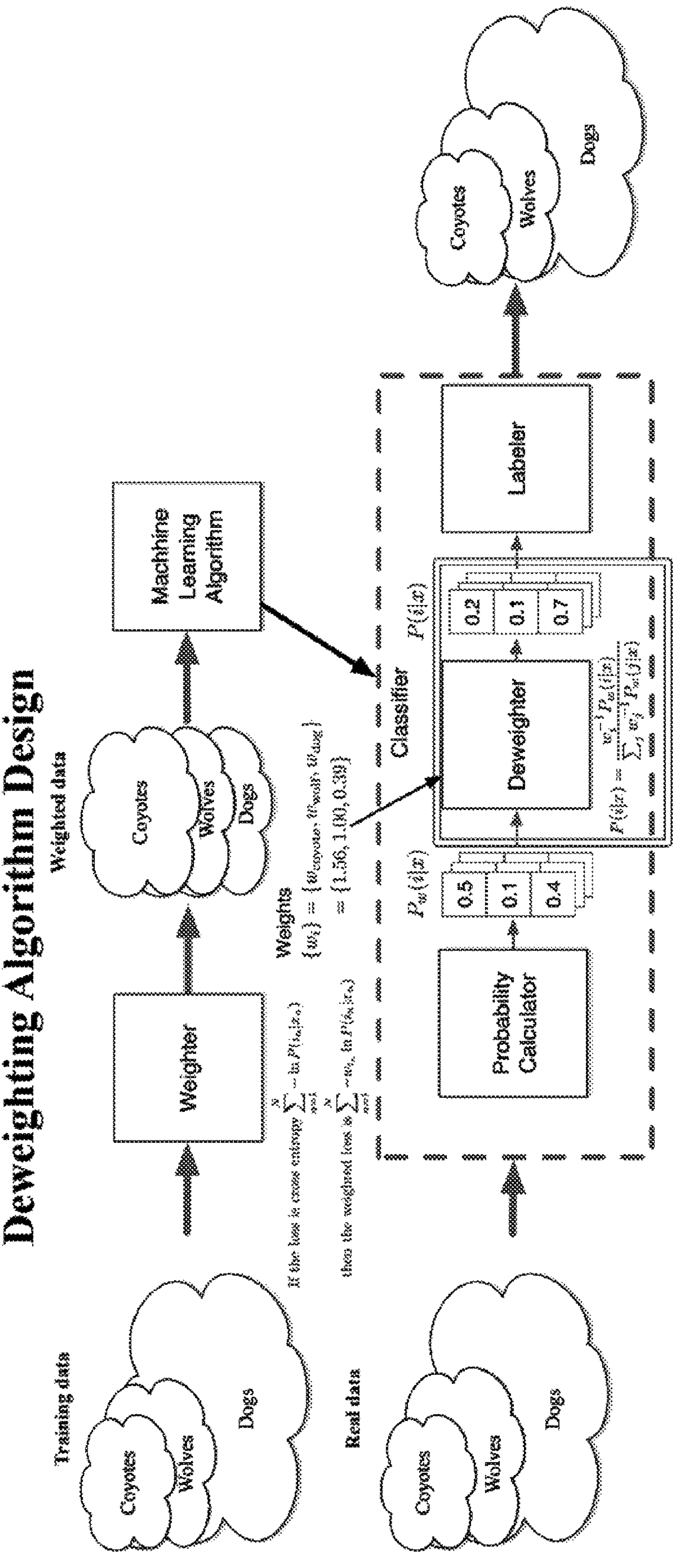
FIG. 3 is a flowchart for correcting weighted biases after machine learning weighted training, according to the method for correcting bias introduced by weighted training in machine learning of the present invention.

FIG. 3 shows the method for learning to classify groups with rare and common examples using machine learning technique of the present invention, and applying the method and program of reconstructing natural weighting to correct the classification bias caused by over-weighting of rare groups in general machine learning. The method for learning to classify groups with rare and common examples using machine learning technique of the present invention includes the following steps:

S1. label the number of examples of each class in data used in training the machine learning classifier: sum up the total number of training examples from class i in the training set and label these quantities $N_i$;

S2. Input the training data into the weighter, and calculate the weight $w_{ij}$ of each data example j in a class i of the training data according to user-given data weighting method;

The "user-given data weighting method" refers to the weight selected by the user according to the data example size of each key class or personal preference. Usually the given weighting method is to balance the machine learning algorithm's attention to different class in the original data. Compared with the statistical weight, the importance of rare classes in the machine learning process is overemphasized. For example, to select a class with relatively few examples in the training data for effective learning, the user can increase the weight of the class by multiples, so that the weight of the class is multiplied by the number of examples in the common classes. The weight of the class multiplied by the number of rare examples is the same as, or higher than, the weight of the common class examples.

S3. Calculate the mean weight for each class in class i of the weighted data. This is done by summing each of the weights $w_{ij}$ given to the examples j by class and then dividing by the total number $N_i$ of class i and label this mean weight $w_i$ of the class i. The mean weight $w_i$ can be calculated according to the following formula:

$$w_i = \frac{1}{N_i}\sum_j w_{ij}; \tag{1}$$

S4. The features of the examples in the weighted data and their corresponding labels are used for classification and regression with a machine learning algorithm;

S5. After training, when the classifier calculates probabilities $P_w(i)$ that some new example is from class i, and correct them by applying the deweighting formula of the deweighter to get accurate probabilities P(i); The deweighting formula is defined as follows:

$$P(i) = \frac{w_i^{-1} P_w(i)}{\sum_n w_n^{-1} P_w(n)} \tag{2}$$

Wherein, each class of object is given the label i, the mean weight used on each class to train the classifier $w_i$, and the probability the classifier assigns to some new example data being from class i is $P_w(i)$; n is a dummy index in the summation operation, $w_n$ is a mean weight of the n-th class, and $P_w(n)$ is a probability for the n-th class assigned by the classifier. Then the bias can be removed by computing revised probabilities according to the deweighting formula.

S6. Use the corrected probabilities P(i) to make a classification decision.

In FIG. 3, the double-lined box section shows the deweighter, the stage in the standard process where the deweighting formula is applied to the data, and its role in the classifier. In the present invention, the classifier could use any probability based classification algorithm, but this example shows a Bayes classifier, and the classifier includes two subunits, namely a probability calculator and a labeler; the probability calculator is used to calculate the probability that each single input example belongs to a certain class; the labeler, according to the probability that the input example belongs to each class calculated by using the probability calculator, decides to assign the example to a single class, and makes a classification decision.

The probabilities the probability calculator produces are first fed through the deweighter, which divides them by the mean weights used in training and then renormalizes, before passing the probabilities on to the labeler. The labeler assigns labels based on the computed probabilities, the example size statistics of the output data set will now match those in the input set as long as: the training set's example population statistics also match the input set's, which is represented in this figure by the data legend area relative size. In the process of calculating the mean weight of each class, the weight of each sample is 1 by default if it has no other specified value. In the process of deweighting, it is advisable to control the number of common examples to prevent possible over-fitting. When the number of common examples exceeds some threshold above the number of rare ones, the common examples should be randomly discarded to bring their number below that threshold. A good threshold for this purpose would be a factor of 2.

The advantage of the "deweighting" method is that it improves the accuracy of the probabilities the classifier assigns to new data in machine learning applications in certain scenarios. Accurate probabilities allow the classifier's users to study the example classification statistics of their actual data with higher accuracy than by looking at the classifier's labels. An example of the usefulness of such statistics is the user can assess reliability and completeness after classification of unlabeled data. This assessment can allow users to adjust the decision boundary in the labeler to meet their required balance in completeness and reliability without retraining the whole classifier.

The "deweighting" method solves ones of the ways that machine learning classifiers can produce biased probabilities, specifically the problem of bias probabilities that arises when machine learning classifiers are trained on data after example ratio or weight adjustment. Whether the balancing was done by weighting or discarding common examples from the data, deweighting is the process of removing the induced bias in the probabilities by dividing the probabilities by the weights (or fraction of data kept) and then normalizing. These methods are used especially when the goal is to classify rare examples in a data set with a large number of common examples that are usually of lesser interest. It is the novel invention that we are applying to protect in this application.

We have performed tests of the effectiveness of the "deweighting" method with both simulated data and with real data from astronomical observations. The results of these tests show that the "deweighting" method works as expected.

The advantage of the simulated trials is that the true probabilities the classifier should produce are analytically calculable. With true probabilities in hand, the accuracy of the probabilities the classifier produces can be measured directly, providing a very sensitive indication of the improvement "deweighting" provides.

Figure 4:
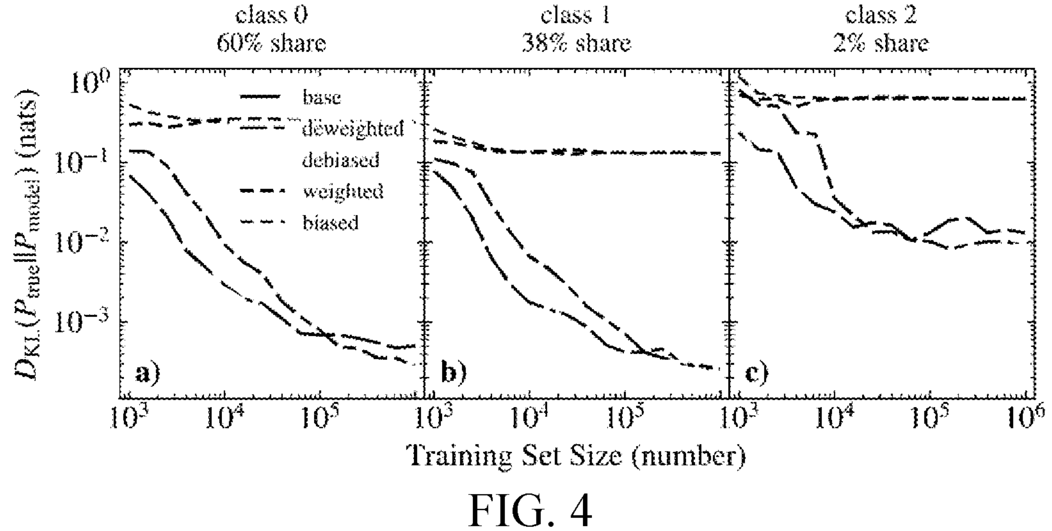
FIG. 4 is a schematic diagram comparing the performance of multiple weighting training schemes on simulated data to a baseline before and after deweighting, according to the method for correcting bias introduced by weighted training in machine learning of the present invention.
Figure 5:
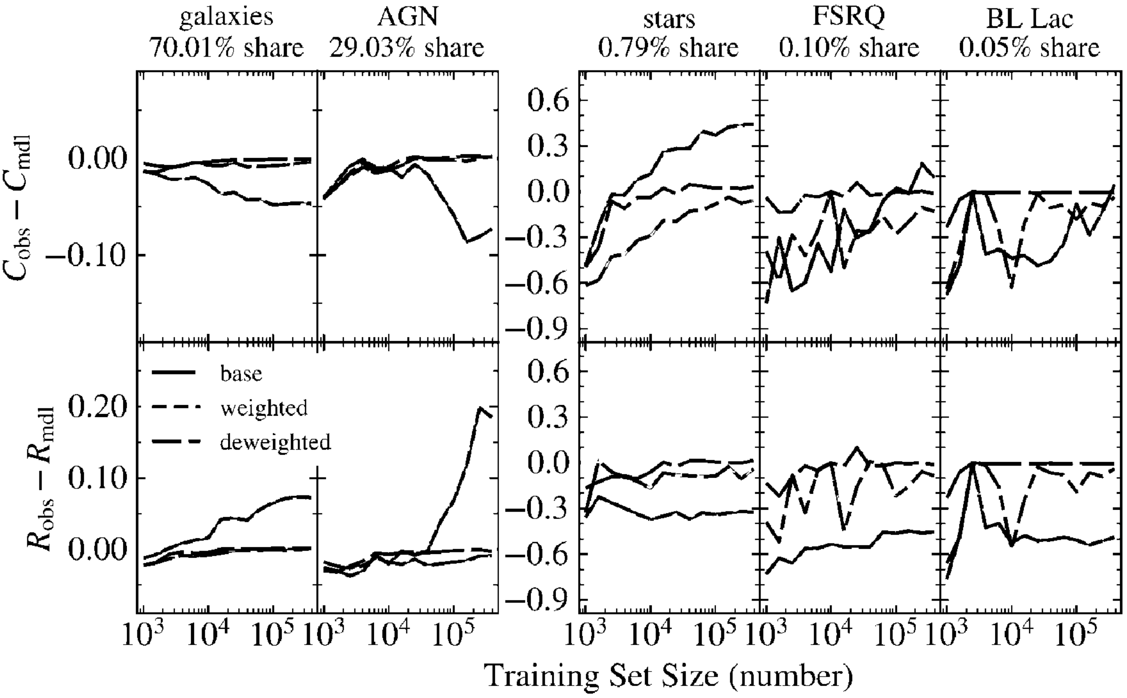
FIG. 5 is a schematic diagram comparing the performance of weighted training on real data to a baseline and after deweighting, according to the method for correcting bias introduced by weighted training in machine learning of the present invention.

In another example, tests were also performed for an upcoming paper on simulated data and real astronomical data sets. FIGS. 4 and 5 are representative of the sort of test results obtained.

FIG. 4 shows one measure of distance between the probabilities the classifier assigns to novel data and the true probabilities calculated analytically. The figure shows three classes of simulated galaxies. The first type of galaxy (class 1) occupies 60% of the parent class, the second type (class 2) occupies 38%, and the third type (class 3) occupies 2%.

Each panel in FIG. 4 shows the probability trend for each cohort category as a function of training set size, with the percentages in the test data labeled above the graph in their percentages. Class 1 represents the most common class, class 2 is the second, and class 3 is the rarest class. The x-axes show the number of examples used in the training set and the y-axes show the average distance from each example's true probability to its model probability (Kullback-Leibler divergence—higher is less accurate). The higher the value, the greater the gap between the true probability and the model probability. The trend lines shown are: the solid red long-striped line, "base," is from the model fit to the data without weighting; the blue short-striped line, "weighted," is from the model fit to weighted data; the purple medium-striped line, "deweighted," is from applying the deweighting scheme to the output of the weighted model. It can be seen from the figure that training the classifier with weighted data will result in a biased classification (blue striped line), while the deweighting process successfully restores the probability of the classifier to the unweighted, close to the true unbiased data (moving results from the purple striped line to the red solid line). As the data example increases, the difference between the true probability calculated by the weighted model and the biased model and the model probability becomes larger. The deweighting method makes the gap between the classification probability of the model example generated by the machine learning model and the real probability of the data decrease and becomes stable, and the deweighting process successfully increases the accuracy of the probabilities a classifier calculates.

FIG. 5 shows the results of a test on real astronomical data. It shows the difference between the completeness (C) and reliability (R) achieved by a classifier application on real data (marked as "obs"), and what it should achieve if its probabilities were accurate (marked as "mdl"). In other words, the closer the line is to zero, the more accurate the probability. Completeness is the proportion of a given true class category that is successfully identified, and reliability is the proportion of a given labeled class category that is correctly identified. As expected, the weights lead to over-complete and unreliable rare object labels, since many targets actually come from public classes that are wrongly assigned to them.

The top five subplots of FIG. 5 represent the difference between the completeness of the actual results and the model completeness calculated by the statistical expectations, while the bottom five subplots represent the difference in reliability of the two results. Each column represents a different type of astronomical object, and is labeled at the top with the type of the astronomical object and the object's prevalence in the training data. The x-axes show the total number of examples in the training set. The light gray line drawn in the figure is the ideal case where the machine learning classifier's probabilities can accurately predict the performance metrics; the red solid line, "base," is from the model fit to unweighted data; the blue short-striped line, "weighted," is from the model fit to weighted data; the purple medium-striped line, "deweighted," is from applying the deweighting method in the machine learning of the present invention to reduce the weighted training bias. As the total example size increases, the weighted model tends to deviate from the ideal value and the real baseline, while the weighted classifier tends to be consistent with the ideal value and the real baseline.

In the above test examples for astronomical bodies, the correction method of the present invention improves the fitting performance of the classifier to the weighted data, so that it produces more accurate probabilities.

The invention claimed is:

1. A processor-implemented method for correcting bias introduced by weighted training in machine learning, comprising the following steps:

Step (1), labeling a number of examples of each class in weighted data used by a machine learning classifier, comprising summing up a total number of training examples from class i in a training data set and labeling a total number as $N_i$;

Step (2), adding a weight to training data, and calculating a weight $w_{ij}$ of each data example j in class i of the training data according to a user-given data weighting method;

Step (3), calculating a mean weight $w_i$ for examples of each class;

Step (4), conducting classification and logistic regression against features of the number of examples in the weighted data and labels corresponding to the features, using a machine learning algorithm Step (5), after training, when calculating probabilities $P_w(i)$ of class after machine training using the machine learning classifier, correcting the probabilities P(i) by applying a deweighting formula of a deweighter to obtain corrected probabilities P(i);

Step (6), making a classification decision based on the corrected probabilities P(i);

wherein in Step 3, calculating the mean weight $w_i$ for examples of each class i comprises: summing up all weights $w_{ij}$ in class i of the weighted data to give a sum, dividing the sum by a total number of examples $N_i$ in class i, where the index j labels all examples in every class, then divide by the total number of examples $N_i$ in class i, and then labeling the mean weight $w_i$, wherein the mean weight $w_i$ is calculated according to the following formula:

$$w_i = \frac{1}{N_i}\sum_j w_{ij}; \text{ and} \tag{1}$$

wherein the weight is corrected using the deweighting formula such that a training weighted bias caused by machine learning algorithms is eliminated through $P_w(i)$ obtained using the following deweighting formula:

$$P(i) = \frac{w_i^{-1} P_w(i)}{\sum_n w_n^{-1} P_w(n)} \tag{2}$$

where i is a label for each class of object, $w_j$ is a mean weight of example data of each class, $P_w(i)$ is a probability of the example data in class i; n is a dummy index in the summation operation, $w_n$ is a mean weight of the n-th class, and $P_w(n)$ is a probability for the n-th class assigned by the machine learning classifier.

2. The processor-implemented method according to claim 1, wherein the machine learning classifier is a Bayes classifier.

3. The processor-implemented method according to claim 1, wherein in Step (2), the user-given data weighting method comprises selecting, by the user, a weight according to the number of examples in each class of training data or according to personal preference.

4. The processor-implemented according to claim 1, wherein the machine learning classifier includes two sub-units: a probability calculator and a labeler;

wherein the probability calculator is configured to calculate a probability that each single input example belongs to a certain class, and the labeler is configured to make a classification decision by deciding a single class to which the single input example is assigned, based on a probability, calculated by using the probability calculator, that the single input example belongs to each class.

5. The processor-implemented method according to claim 2 wherein the adding a weight in Step (2) comprises assigning a weight to each training data example and serving the weight as a basis for calculating a probability of training in the Bayes classifier.

6. The processor-implemented method according to claim 4, wherein the deweighter is used to correct the probability $P_w(i)$ calculated by the probability calculator by applying the deweighting formula to obtain accurate probabilities P(i).

7. The processor-implemented method according to claim 6, whenever a process of calculating the mean weight of each class is performed, a weight of each sample is 1 by default unless it is otherwise specified.

8. The processor-implemented method according to claim 1, wherein the weighted bias is corrected by dividing each probability of class calculated by each machine learning classifier by a corresponding weight for each class, and then the probabilities across all classes are renormalized.

9. The processor-implemented method according to claim 7, wherein in a process of deweighting, a number of common examples is first controlled within a calculable range by discarding a fraction of common examples; and when a ratio of common examples to rare examples exceeds a specified threshold, the common examples are randomly discarded until the ratio is less than the specified threshold.

* * * * *